United States Patent Office 2,808,413
Patented Oct. 1, 1957

2,808,413

IMIDAZOLINE DERIVATIVES OF 2-ARYL INDOLINES

Walter Schindler and Franz Hafliger, Basel, Switzerland, assignors to J. R. Geigy A. G., Basel Switzerland, a Swiss firm No Drawing. Original application May 11, 1954, Serial No. 429,102, now Patent No. 2,751,393, dated June 19, 1956. Divided and this application March 20, 1956, Serial No. 576,513

Claims priority, application Switzerland May 13, 1953

3 Claims. (Cl. 260—309.6)

This invention is concerned with imidazoline derivatives of 2-aryl indolines of the general formula:

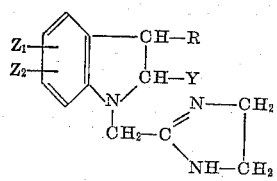

wherein R represents hydrogen or a lower alkyl group, Y represents a member selected from the group consisting of phenyl radicals substituted at vicinal carbon atoms by a bivalent radical selected from the group consisting of trimethylene and tetramethylene radicals, phenyl radicals substituted by at most two members selected from the group consisting of hydrogen, halogen, lower alkyl, lower alkoxy and hydroxy radicals, and naphthyl radicals substituted by one member selected from the group consisting of hydrogen, halogen and lower alkyl radicals, $Z_1$ represents hydrogen, halogen, a lower alkyl or alkoxy group or a hydroxyl group and $Z_2$ represents hydrogen, halogen or a lower alkyl group.

It has now been found that compounds of this type have an excellent sympathicolytic action.

The new compounds can be produced by reacting at a raised temperature a compound of the general formula:

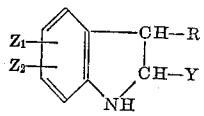

with a salt of a 2-halogen methyl-imidazoline of the general formula:

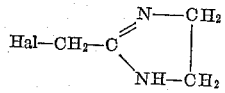

wherein Hal represents a halogen atom and R, Y, $Z_1$ and $Z_2$ have the meanings given above. At about 130–160°, the reaction is completed within a few hours. It is advantageous to perform the reaction in a melt without the addition of solvents or diluents whilst ensuring the exclusion of oxygen from the atmosphere. If desired compounds containing alkoxy groups can then be hydrolysed to form compounds containing hydroxyl groups.

A modification of the method described above which can be used, however, only for the production of derivatives containing no hydroxyl groups consists in converting a compound of the general formula:

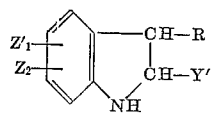

wherein R, and $Z_2$ have the meanings given above, and

Y' has the meaning given above for Y with the exception of hydroxyl substituted phenyl radicals, and $Z'_1$ has the meaning given above for $Z_1$ with the exception of the hydroxyl group, into its alkali salt by means of a compound giving off alkali, such as, e. g. sodium amide, potassium amide, lithium hydride or by means of an alkali metal and then reacting this alkali salt with a 2-halogen methyl-imidazoline of the general Formula III. This reaction is performed advantageously in solvents at less high temperatures, e. g. in boiling benzene or in other hydrocarbons of the benzene series.

The 2-aryl indolines used as starting materials can be easily obtained from 2-aryl indoles for example by reduction with zinc and hydrochloric acid. The 2-aryl indoles and their substitution products necessary as starting materials for the reduction are obtained from phenyl hydrazones, which may be substituted if desired, of acetophenone, propiophenone, butyrophenone, β-acetonaphthone etc., as well as further substitution products of the latter which carry in the aromatic nucleus of the ketone component and/or of the hydrazine component the substituents according to the definition, by heating with zinc chloride. They can also be easily obtained by heating with ether borofluoride in an inert solvent such as toluene.

The following compounds for example can be named as substituted 2-aryl indoles suitable for reduction to the corresponding 2-aryl indolines:

2-(4'-chlorophenyl)-indole
2-(4'-bromophenyl)-indole
2-(4'-methyl-phenyl)-indole
2-(4'-ethyl-phenyl)-indole
2-(4'-isopropyl-phenyl)-indole
2-(3'-methyl-4'-chlorophenyl)-indole
2-(3'.4'-dimethyl-phenyl)-indole
2-hydrindenyl-(5')-indole
2-[5'.6'.7'.8'-tetrahydronaphthyl-(2')]-indole
2-β-naphthyl-indole
2-(2'-methoxy-phenyl)-indole
2-(3'-methoxy-phenyl)-indole
2-(4'-ethoxy-phenyl)-indole
2-(3'-hydroxyphenyl)-indole
2-(4'-hydroxyphenyl)-indole
2-phenyl-5-chlor-indole
2-phenyl-6-chlor-indole
2-phenyl-5.6-dichlor-indole
2-phenyl-5-brom-indole
2-phenyl-5-methyl-indole
2-phenyl-7-methyl-indole
2-phenyl-5.6-dimethyl-indole
2-phenyl-5-methoxy-indole
2-phenyl-6-methoxy-indole
2-phenyl-5-hydroxy-indole
2-(4'-chlorophenyl)-5-chlor-indole
2-(4'-hydroxyphenyl)-5-chlor-indole
2-(4'-chlorophenyl)-5-methyl-indole
2-(3'-methoxy-phenyl)-6-methoxy-indole
2-phenyl-3-methyl-indole
2-β-naphthyl-3-methyl-indole
2-[5'.6'.7'.8'-tetrahydronaphthyl-(2')]-3-methyl-indole
2-phenyl-3-ethyl-indole
2-phenyl-3-propyl-indole
2-phenyl-3-isopropyl-indole 2-chloromethyl- and 2-bromomethyl-4.5-imidazoline can be used as second reaction component. They can be easily obtained from chloro- or bromo-acetonitrile and ethylene diamine.

With inorganic or organic acids such as e. g. hydrochloric acid, hydrobromic acid, sulphuric acid, phosphoric acid, ethane disulphonic acid, methane sulphonic acid, tartaric acid, acetic acid, or citric acid, the new compounds form salts some of which are easily soluble in water.

The new compounds can be administered therapeutically, e. g. for the treatment of disturbances of the peripheral circulation or of hypertension, either per os or parenterally. The new compounds can be formed into tablets either as such or in the form of their salts combined with suitable carriers, e. g. with starch, lactose or talc. The aqueous solutions of some of the salts have an almost neutral reaction. After being made isotonic, if necessary and after sterilisation, they can also be administered by injection. If desired, for therapeutical application the new compounds can be combined with substances having a similar action or, for example, with substances having a blocking effect on the ganglia.

EXAMPLE 1

*1-[imidazolinyl-(2')-methyl]-2-phenyl indoline*

10 parts of 2-phenyl indoline and 5 parts of 2-chloromethyl imidazoline hydrochloride are heated in an oil bath for 6 hours at 140–150° inner temperature under the introduction of nitrogen. The reaction mixture is then dissolved in hot alcohol, the alcoholic solution is poured into water and ethered out. The aqueous phase is made alkaline and the precipitated 1-[imidazolinyl-(2')-methyl]-2-phenyl indoline is recrystallised from ethyl acetate. M. P. 139–140°.

EXAMPLE 2

*1 - [imidazolinyl - (2') - methyl] - 2 - (3" - methoxyphenyl) - indoline and 1 - [imidazolinyl - (2') - methyl]-2-(3"-hydroxyphenyl)-indoline*

13 parts of 2-(3'methoxyphenyl)-indoline and 6.5 parts of chloromethyl imidazoline hydrochloride are heated at 150–160° for 6 hours. The melt is dissolved hot in 60 parts by volume of alcohol, then poured into 180 parts by volume of water and extracted with ether. The acid aqueous phase is made alkaline with concentrated caustic soda lye upon which 1-[imidazolinyl-(2')-methyl]-2-(3"-methoxyphenyl)-indoline precipitates. After filtering off, it is recrystallized from ethyl acetate. M. P. 140°. The alkaline filtrate is made acid to Congo red with concentrated hydrochloric acid and 1-[imidazolinyl-(2')-methyl]-2-(3"-hydroxyphenyl)-indoline is precipitated with concentrated ammonia. It is recrystallized from methanol. M. P. 224–225°.

The following compounds can be produced in an analogous manner:

1 - [imidazolinyl - (2') - methyl] - 2 - (4" - chlorophenyl)-indoline, M. P. 160–161°

1 - [imidazolinyl - (2') - methyl] - 2 - (4" - methylphenyl)-indoline, M. P. 160°

1 - [imidazolinyl) - (2') - methyl] - (4" - ethyl - phenyl)-indoline, M. P. 122°

1 - [imidazolinyl - (2') - methyl] - (3",4" - dimethylphenyl)-indoline, M. P. 142°

1 - [imidazolinyl - (2') - methyl] - 2 - hydrindenyl-(5")-indoline, M. P. 124°

1 - [imidazolinyl - (2') - methyl] - 2 - [5",6",7",8" - tetrahydronaphthyl-(2")]-indoline, M. P. 139–140°

1 - [imidazolinyl - (2') - methyl] - 2 - β - naphthyl-indoline, M. P. 141–142°

1 - [imodazolinyl - (2') - methyl] - 2 - (4" - chlorophenyl)-5-chlor-indoline, M. P. 168–169°

1 - [imidazolinyl - (2') - methyl] - 2 - (4" - methylphenyl)-5-chlor-indoline, M. P. 166°

1 - [imidazolinyl - (2') - methyl] - 2 - phenyl - 5,6-dichlor-indoline

1 - [imidazolinyl - (2') - methyl] - 2 - (4" - chlorophenyl)-5-methyl-indoline, M. P. 179–181° on decomposition 1 - [imidazolinyl - (2') - methyl] - 2 - (4" - methylphenyl)-5-methyl-indoline, M. P. 171–172°

1 - [imidazolinyl - (2') - methyl] - 2 - phenyl - 5,6-dimethyl-indoline

1 - [imidazolinyl - (2') - methyl] - 2 - (3" - methoxyphenyl)-6-methoxy-indoline, M. P. 140°

1 - [imidazolinyl - (2') - methyl] - 2 - β - naphthyl - 6-methoxy-indoline

1 - [imidazolinyl - (2') - methyl] - 2 - (4" - methylphenyl)-6-hydroxy-indoline, M. P. 218–220°

1 - [imidazolinyl - (2') - methyl] - 2 - phenyl - 3 - methylindoline, M. P. 137°

1 - [imidazolinyl - (2') - methyl] - 2 - phenyl - 3 - methyl-6-methoxy-indoline, M. P. 155–156°

1 - [imidazolinyl - (2') - methyl] - 2 - (4" - ethylphenyl)-3-methyl-indoline

1 - [imidazolinyl - (2') - methyl] - 2 - phenyl - 3 - ethylindoline; and

1 - [imidazolinyl - (2') - methyl] - 2 - [6" - chloronaphthyl-(2")]-indoline

The present application is a division of U. S. patent application, Ser. No. 429,102, filed May 11, 1954, now Patent No. 2,751,393.

What we claim is:

1. A compound corresponding to the general formula:

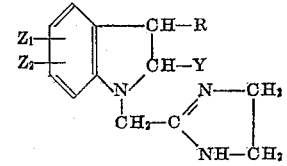

wherein R represents a member selected from the group consisting of hydrogen and lower alkyl radicals, Y represents a member selected from the group consisting of phenyl radicals substituted at vicinal carbon atoms by a bivalent radical selected from the group consisting of trimethylene and tetramethylene radicals, phenyl radicals substituted by at most two members selected from the group consisting of hydrogen, halogen, lower alkyl, lower alkoxy and hydroxy radicals, and naphthyl radicals substituted by one member selected from the group consisting of hydrogen, halogen and lower alkyl radicals, $Z_1$ represents a member selected from the group consisting of hydrogen, halogen, lower alkyl, lower alkoxy and hydroxyl radicals, and $Z_2$ represents a member selected from the group consisting of hydrogen, halogen and lower alkyl radicals.

2. 1 - [imidazolinyl - (2') - methyl] - 2 - (4" - methylphenyl)-6-methoxy-indoline.

3. 1 - [imidazolinyl - (2') - methyl] - 2 - (4" - methylphenyl)-5-chlor-indoline.

References Cited in the file of this patent

UNITED STATES PATENTS 2,751,393    Schindler et al. _____ June 19, 1956